(12) United States Patent
Sogabe et al.

(10) Patent No.: US 8,269,375 B2
(45) Date of Patent: Sep. 18, 2012

(54) COIL UNIT, AND POWER TRANSMISSION DEVICE AND POWER RECEPTION DEVICE USING THE COIL UNIT

(75) Inventors: Haruhiko Sogabe, Chino (JP); Takahiro Kamijo, Fujimi-cho (JP); Minoru Hasegawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 12/727,675

(22) Filed: Mar. 19, 2010

(65) Prior Publication Data
US 2010/0244579 A1    Sep. 30, 2010

(30) Foreign Application Priority Data

Mar. 26, 2009  (JP) ................................. 2009-075975
Mar. 16, 2010  (JP) ................................. 2010-059520

(51) Int. Cl.
*B60L 1/00*  (2006.01)

(52) U.S. Cl. ......................................... 307/104; 307/9.1
(58) Field of Classification Search .................. 307/104, 307/9.1
See application file for complete search history.

(56) References Cited

U.S. PATENT DOCUMENTS

| 6,265,789 B1 * | 7/2001 | Honda et al. ..................... 307/33 |
| 7,952,322 B2 * | 5/2011 | Partovi et al. ................... 320/108 |
| 2011/0291819 A1 * | 12/2011 | Kaeriyama .............. 340/286.01 |

FOREIGN PATENT DOCUMENTS

JP  A-11-332135   11/1999
JP  A-2005-006396  1/2005

* cited by examiner

*Primary Examiner* — Danny Nguyen
(74) *Attorney, Agent, or Firm* — Oliff & Berridge, PLC

(57) ABSTRACT

A coil unit includes a first coil having an outer diameter of D1, and at least one second coil having an outer diameter of D2 (D2<D1). The at least one second coil is arranged on a transmission surface side of the first coil. A part or whole of the at least one second coil overlaps the first coil, when viewed from the transmission surface side.

6 Claims, 13 Drawing Sheets

Negotiation frame

| Head field | Information field | | End field |
|---|---|---|---|
| | Hardware information code | Matching code | |

FIG. 12A

General code

| Command ID | Coil code (classification code, coil ID) | Extension code | Standard code |
|---|---|---|---|

FIG. 12B

Hardware information code

| Hardware information | |
|---|---|
| Foreign object threshold | System code (system information) |

FIG. 12C

COIL UNIT, AND POWER TRANSMISSION DEVICE AND POWER RECEPTION DEVICE USING THE COIL UNIT

The present application claims a priority based on Japanese Patent Application No. 2009-075975 filed on Mar. 26, 2009 and Japanese Patent Application No. 2010-059520 filed on Mar. 16, 2010, the contents of which are incorporated herein by reference.

BACKGROUND

1. Technical Field

The present invention relates to coil units, and power transmission devices and power reception devices using the coil units.

2. Related Art

In recent years, contactless power transmission (non-contact power transmission) that utilizes electromagnetic induction to enable power transmission without metal-to-metal contact has been attracting attention. As application examples of non-contact power transmission, charging a portable telephone, charging a household appliance (e.g., cordless telephone handset), and the like have been proposed.

JP-A-2005-006396 (Patent Document 1) is an example of related art of the contactless power transmission. According to Patent Document 1, a power transmission device and a primary coil to which an output of the power transmission device is applied are provided on a charging side, and a secondary coil to be electromagnetically coupled to the primary coil, a power reception device that generates a DC voltage from an output of the secondary coil, and a secondary battery that is charged based on the output of the power reception device are provided on a power receiving side. Patent Document 1 further describes a charge control device (8) that monitors the state of charging progression and varies the AC frequency of the power transmission device to a specified value according to the state of charging progression. For performing the charging control, a coil pair (an auxiliary transformer 85) for communication is independently provided in addition to the primary and secondary coils for power transmission.

JP-A-11-332135 (Patent Document 2) is another example of related art that describes a secondary coil (210) that is commonly used for power transmission and communication. According to Patent Document 2, a secondary coil (210) is provided on an electronic clock (200) on the power receiving side, and an inner peripheral coil (110a) and an outer peripheral coil (110b) arranged in a concentric manner at positions opposite to the secondary coil (210) are provided in a station (100) on the power receiving side. When transmitting power to the electronic clock (200) at the station (100), the outer peripheral coil (110b) with a fewer number of turns is used. On the other hand, when transmitting signals to the electronic clock (200), a serial coil composed of the inner peripheral coil (110a) and the outer peripheral coil (110b) is used.

According to Patent Document 1, the coil pair for communication must be provided independently, in addition to the primary coil and the secondary coil for power transmission. According to Patent Document 2, the inner peripheral coil (110a) and the outer peripheral coil (110b) arranged in a concentric manner need to be provided as the primary side coil.

SUMMARY

In accordance with some embodiments of the invention, it is possible to provide coil units, and power transmission devices and power reception devices using the coils, which do not increase a two-dimensional occupancy space for multiple coils that may be arranged for independent usages, such as, power transmission and communication.

In accordance with an embodiment of the invention, a coil unit includes: a first coil having an outer diameter of D1; and at least one second coil having an outer diameter of D2 (D2<D1), wherein the at least one second coil is arranged on a transmission surface side of the first coil, and a part or whole of the at least one second coil overlaps the first coil as viewed from the transmission surface side.

In accordance with an aspect of the embodiment of the invention, the part or whole of the at least one second coil having the outer diameter D2 (D2<D1) is stacked and laminated on the transmission surface side of the first coil having the outer diameter D1. Therefore, an area occupancy of the first coil and the at least one second coil does not increase because the at least one second coil is stacked such that it overlaps the occupied area of the first coil that is used for, for example, power transmission. The whole of the at least one second coil may be arranged to be stacked on the first coil to keep the area occupancy of the first coil and the at least one second coil within the occupied area of the first coil Moreover, the at least one second coil is provided on the transmission surface side of the first coil, such that the magnetic flux of the second coil would not be disturbed by the first coil. It is possible to maintain the transmission function of the first coil while keeping the area occupancy of the first coil and the second coil from increasing, even though the part of the at least one second coil is arranged to be stacked on the first coil.

In accordance with another aspect of the embodiment of the invention, the center of the at least one second coil may not coincide with the center of the first coil, as viewed from the transmission surface.

The center of each of the coils is an area where the magnetic flux density of the coil is the highest. As the high magnetic flux density areas of the coils do not overlap each other, it is possible to reduce electromagnetic coupling of the first and second coils. Even if the center of the first coil does not coincide with the center of the at least one second coil, reducing the area occupancy of the first coil and the at least one second coil would be effectively realized by superposing the center of the at least one second coil on the first coil, for example.

In accordance with an aspect of the embodiment of the invention, each of the first coil and the at least one second coil may be an air-core coil having an air-core section at the center thereof, and the first coil and the at least one second coil may be arranged such that the outer periphery of the at least one second coil does not overlap the air core section of the first coil.

The center of each of the coils is an area where the magnetic flux density of the coil is the highest. As the high magnetic flux density areas of the coils do not overlap each other, it is possible to reduce electromagnetic coupling of the first and second coils.

In accordance with an aspect of the embodiment of the invention, a plurality of the second coils may be arranged at equal intervals in a circumferential direction of the first coil.

When the coil units in accordance with the embodiment of the invention are disposed on the primary side and the secondary side, the first coils on the primary side and the secondary side may be electromagnetically coupled with each other, but there is a possibility that the second coils on the primary side and the secondary side may not be electromagnetically coupled. This is because the second coils on the primary side and the secondary side may be arranged shifted in the circumferential direction about the center of the first coils, as they have a smaller outer diameter, and are present at positions eccentric to the centers of the first coils on the primary side and the secondary side. Therefore, by disposing the plurality of the second coils at equal intervals in the circumferential direction about the center of the first coil on at least one of the primary side and the secondary side, mutual electromagnetic coupling of the second coils would be more readily secured.

Another embodiment of the invention pertains to a power transmission device that transmits power to a power reception device. The power transmission device includes: one of the coil units described above, and a power transmission control device that controls driving of the first coil and the at least one second coil of the coil unit, wherein the power transmission control device controls power transmission to the power reception device through the first coil, and controls data communication with the power reception device through the second coil.

Still another embodiment of the invention pertains to a power reception device that receives power transmitted from a power transmission device. The power reception device includes one of the coil units described above, and a power reception control device, wherein the power reception control device controls power reception of the power from the power transmission device through the first coil, and controls data communication with the power transmission device through the second coil.

According to the power transmission device or the power reception device, at least a part of the at least one second coil is stacked and disposed within the occupied area of the first coil used for power transmission, the area occupancy may be prevented from increasing even through the at least one second coil used for data communication is additionally provided. Moreover, as the at least one second coil is provided on the transmission surface side of the first coil, the magnetic flux of the second coil would not be disturbed by the first coil.

BRIEF DESCRIPTION OF THE DRAWINGS

FIGS. 12A-12C are views showing examples of negotiation frame formats.

DESCRIPTION OF EXEMPLARY EMBODIMENTS

Preferred embodiments of the invention are described in detail below. It is noted that the embodiments described below should not unduly limit the content of the invention recited in the scope of the claimed invention, and all of the compositions to be described in the embodiments may not necessarily be indispensable as means for solution provided by the invention.

1. Electronic Apparatus

Figure 1A:
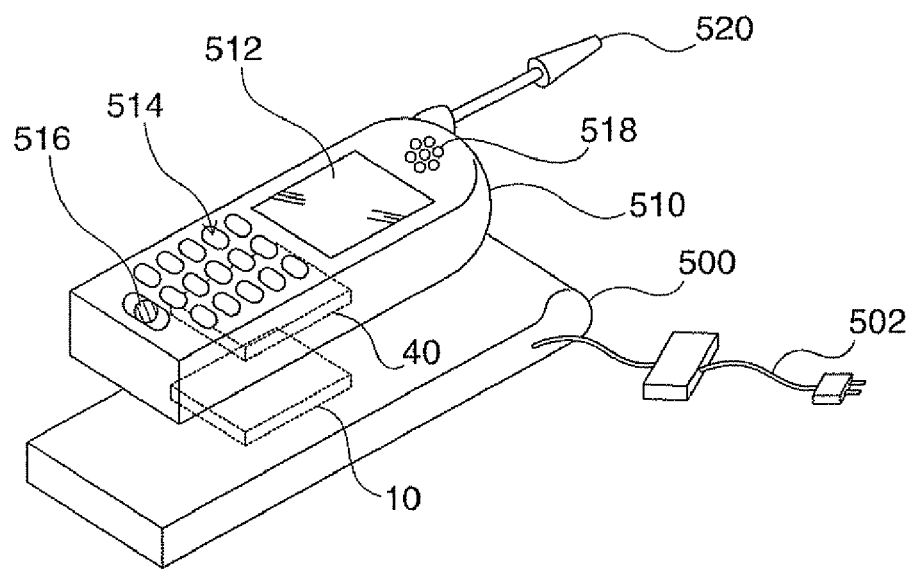
FIGS. 1A and 1B are views explaining contactless power transmission.

FIG. 1A is an illustration showing an example of an electronic apparatus to which a contactless power transmission method in accordance with an embodiment of the invention is applied. A charger 500 (a cradle) that is one of electronic apparatuses includes a power transmission device 10. A portable telephone 510 that is one of electronic apparatuses includes a power reception device 40. The portable telephone 510 includes a display section 512 such as an LCD, an operation section 514 composed of buttons and the like, a microphone 516 (a voice input section), a speaker 518 (a voice output section), and an antenna 520.

Power is supplied to the charger 500 through an AC adapter 502, and the power is transmitted from the power transmission device 10 to the power reception device 40 by contactless power transmission. Accordingly, a battery of the portable telephone 510 can be charged and devices in the portable telephone 510 can be operated.

The electronic apparatus according to the embodiment is not limited to the portable telephone 510. For example, the embodiment is applicable to various electronic apparatuses such as watches, cordless phones, shavers, electric toothbrushes, wrist computers, handheld terminals, portable information terminals, electric bicycles, and IC cards.

Figure 1B:
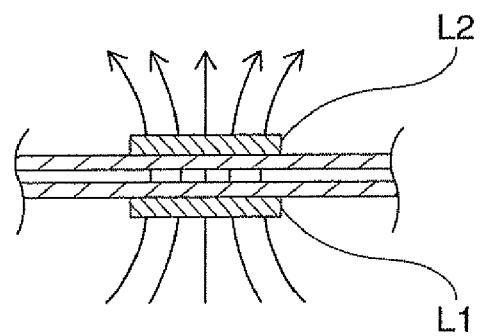

As schematically shown in FIG. 1B, power is transmitted from the power transmission device 10 to the power reception device 40 by electromagnetically coupling a primary side first coil L11 (a power transmission coil) provided on the power transmission device 10 side and a secondary side first coil L21 (a power receiving coil) provided on the power reception device 40 side thereby forming a power transmission transformer. This structure enables contactless power transmission to be performed.

2. Coil Unit

Figure 2:
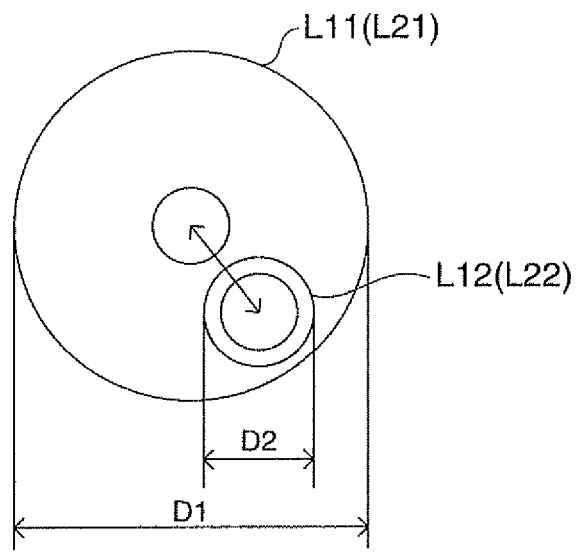
FIG. 2 is a view explaining a positional relation of the first and second coils in a plane.

FIG. 2 shows a coil unit LU that is provided on the power transmission device 10 and/or the power reception device 40.

Here, a primary coil unit LU1 that is provided on the power transmission device 10 is described. It is noted however that a secondary coil unit LU2 that is provided on the power reception device 40 can also be composed in a similar manner.

The primary coil unit shown in FIG. 2 includes a first coil L11 for power transmission having an outer diameter D1, and a second coil L12 for communication having an outer diameter D2 (D2<D1). As viewed from a transmission surface side, the outer periphery of the second coil L12 is located inside the outer periphery of the first coil L11. In other words, the second coil L12 is laminated on the transmission surface side of the first coil L11. Here, the transmission surface of the first coil L11 means a surface side of the coil L11 which is opposite to the coil L21, as shown in FIG. 1B.

Figure 3:
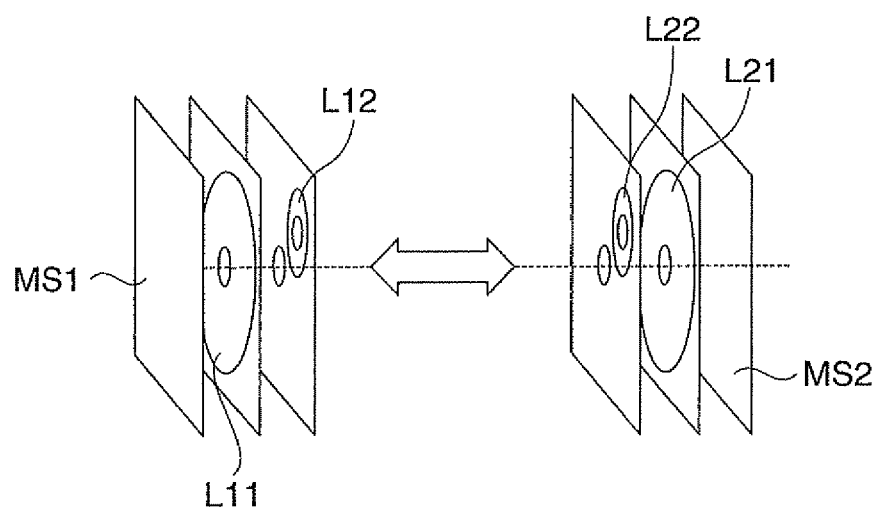
FIG. 3 is an exploded perspective view of a primary side coil unit and a secondary side coil unit.

FIG. 3 is an exploded perspective view of a primary coil unit LU1 and a secondary coil unit LU2, each having a composition similar to the composition shown in FIG. 2, which are arranged opposite to each other. The primary coil unit LU1 is formed from a magnetic body, for example, a magnetic sheet MS1, a first coil L11 and a second coil L12 laminated in this order from the non-transmission surface side. Similarly, the secondary coil unit LU1 is formed from a magnetic body, for example, a magnetic sheet MS2, a first coil L12 and a second coil L22 laminated in this order from the non-transmission surface side.

Figure 4:
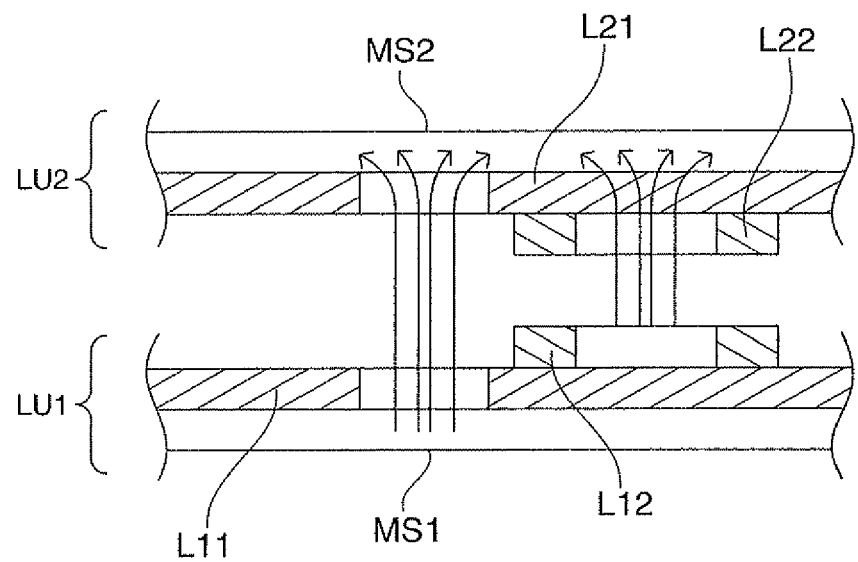
FIG. 4 is a view explaining a coupling state of coils for power transmission and a coupling state of coils for communication.

FIG. 4 schematically illustrates an electromagnetically coupled state of the primary and secondary coil units LU1 and LU2 shown in FIG. 3. The primary side first coil L11 shown in FIG. 3 is electromagnetically coupled with the secondary side first coil L21. By this, power can be transmitted between the first coils L11 and L21. The primary side second coil L12 shown in FIG. 3 is electromagnetically coupled with the secondary side second coil L22. By this, communication can be performed between the second coils L12 and L22.

In particular, according to FIG. 2 and FIG. 3, in both of the cases of the primary coil unit LU1 and the secondary coil unit LU2, the first coils L11 (L21) and the second coils L12 (L22) are arranged to have a positional (non-concentric) relation in which, as viewed from the transmission surface side, the center of the second coil L12 (L22) does not coincide with the center of the first coil L11 (L12). Therefore, a coil center area with the highest magnetic flux density between the first coils L11 and L21 does not overlap a coil center area with the highest magnetic flux density between the second coils L12 and L22. For this reason, mutual interference between the magnetic flux of the first coils L11 and L21 and the magnetic flux of the second coils L12 and L22 can be reduced. In other words, a reduction in the degree of coupling between the first coils L11 and L21 due to the presence of the second coils L12 and L22 can be suppressed to the minimum. Similarly, a reduction in the degree of coupling between the second coils L12 and L22 due to the presence of the first coils L11 and L21 can be suppressed to the minimum.

In accordance with an embodiment of the invention, in both of the primary coil unit LU1 and the secondary coil unit LU2, the first coil L11 (L21) and the second coil L12 can be an air-core coil having an air-core at its center. In this case, the first coil L11 (L21) and the second coil L12 (L22) may preferably be arranged in a positional relation in which, as viewed from the transmission surface side, the outer periphery of the second coil L12 (L22) does not overlap the air-core section of the first coil L11 (L21). This is because the density of the magnetic flux passing through the air-core section is the highest, as shown in FIG. 4.

According to the experiments conducted by the inventors, it became clear that, when a metal foreign object is disposed at a position away from the air-core section of each of the first coils L11 and L21, in a state in which the first coils L11 and L21 are mutually coupled as shown in FIG. 4, an elevation in temperature of the metal foreign object is too little to cause a problem. This means that the reduction in mutual coupling of the first coils L11 and L21 is small even by the presence of a metal foreign object located out of the air-core section. Therefore, even when the second coils L12 and L22, instead of the metal foreign object, are arranged at positions away from the air-core sections of the first coils L11 and L21, a reduction in mutual coupling between the first coils L11 and L21, if any, does not cause a problem.

It is ideal if the primary side first coil L11 is electromagnetically coupled only with the secondary side first coil L21, and the primary side second coil L12 is electromagnetically coupled only with the secondary side second coil L22. However, as long as the primary side first coil L11 is electromagnetically coupled with the secondary side first coil L21, influence on the mutual coupling of the first coils by the primary side second coil L12 may be permissible if the resonance system of the primary side and the secondary side first coils L11 and L21 can be adjusted. Therefore, it is permissible if a portion of the outer shape of the second coil L12 (L22) overlaps the air-core section of the first coil L11 (L21).

Figure 5:
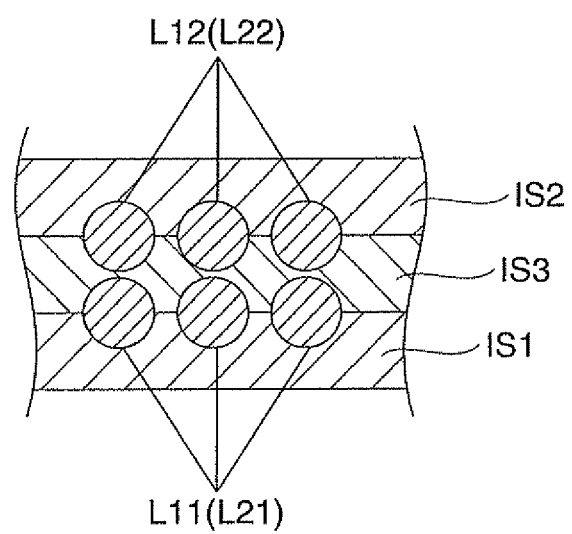
FIG. 5 is a cross-sectional view showing a laminated portion of the first and second coils.

FIG. 5 schematically shows an example of the cross-sectional structure of the laminated portion of the first coil L11 (L21) and the second coil L12 (L22). The first coil L11 (L21) is made of a coil wire that is formed in a spiral configuration on a first insulation sheet IS1, and the second coil L12 (L22) is made of a coil wire that is formed in a spiral configuration on a second insulation sheet IS2. A third insulation sheet IS3 (for example, adhesive or an adhesive sheet) is placed between the first and second insulation sheets IS1 and IS2, whereby the coil wires of the first and second coils are electrically insulated from each other. The cross-sectional structure shown in FIG. 5 is only an example, and is not limited to this structure. It only requires that the first coil L11 (L21) and the second coil L12 (L22) are laminated in their thickness direction, and the coil wires are electrically insulated from each other.

3. Comparison Examples of Coil Units

Figures 6A, 6B:
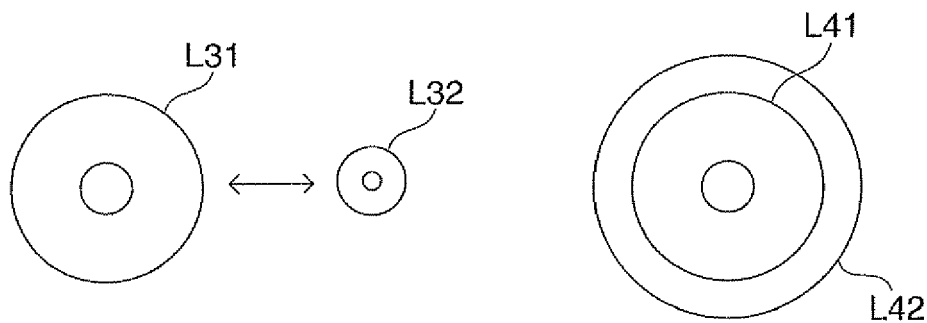
FIGS. 6A and 6B are views showing comparison examples of two plane arrangements of coils.

FIGS. 6A and 6B schematically show positional relationship between first and second coils described in Patent Documents 1 and 2. FIG. 6A shows an ordinary positional relation between a coil L31 for power transmission and a coil L32 for communication, in which the coils do not overlap each other in a two-dimensional plane. FIG. 6B schematically shows a relation between concentrically arranged inner peripheral coil L41 and outer peripheral coil L42. In both of FIGS. 6A and 6B, the additional coil L32 (L42) must be disposed at a position outside the occupied area of the coil L31 (L41) for power transmission. That means, as shown in both of FIGS. 6A and 6B, the inner peripheral coil L41 is not arranged to be stacked on the outer peripheral coil L42.

In contrast, in accordance with the present embodiment, on both of the primary side and the secondary side, the second coil L12 (L22) can be disposed within the occupied area of the first coil L11 (L21) used for power transmission, such that the coil arrangement space would not increase while enabling power and signal transmissions, or the like between the first coil L11 (L21) and the second coil L12 (L22).

4. Modification Example of Coil Unit

Figure 7:
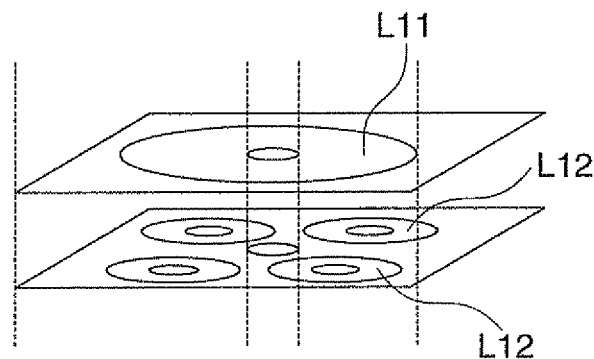
FIG. 7 is a view showing a modification example of the coil unit in which plural second coils are arranged.

FIG. 7 shows a modification example of the primary side coil unit LU1 in which a plurality of, for example, four second coils L12 are arranged with respect to one first coil L11. The plural second coils L12 are arranged in the primary side coil unit LU1 because of the following reason. If the portable telephone 510 that is an electronic apparatus is placed on the charger 500 in a manner that the power reception device 40 is always disposed diametrically opposite to the power transmission device 10, as shown in FIG. 1A, the second coils L12 and L22 can be mutually disposed diametrically opposite to each other, as shown in FIG. 3. However, this is not always the case. FIG. 7 shows an arrangement of the second coils L12 which is effective even when the portable telephone 510 is disposed rotated in a circumferential direction about the diametrical center (i.e., the center of the first coil L11). Specifically, the four second coils L12 are arranged at intervals of 90 degrees about the center of the first coil L11. Accordingly, even when the second coils L22 on the secondary side are disposed in a rotationally shifted position, they are disposed opposite to one or two of the four second coils L12 on the primary side, and would not become non-opposite to one another. In this instance, a positioning device for positioning the charger 500 with the portable telephone 510 may preferably be used together in order that the centers of the first coils L11 and L21 generally coincide with each other. The structure arranged with a plurality of the second coils shown in FIG. 7 is also applicable to the secondary side unit LU2, or may be applied to both of the primary and secondary coil units LU1 and LU2.

Figure 8:
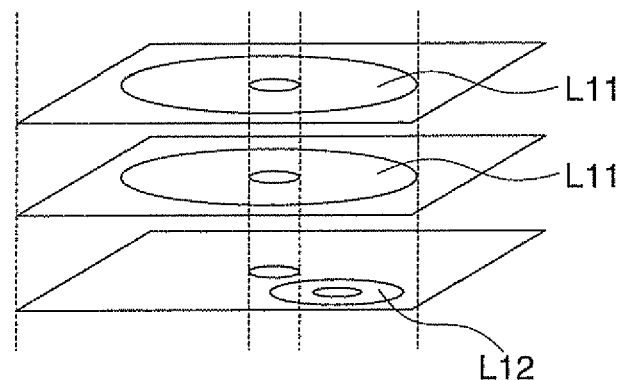
FIG. 8 is a view showing a modification example of the coil unit in which plural first coils are arranged.

FIG. 8 shows a modification example of the primary side coil unit LU1 in which a plurality of, for example, two first coils L11 are laminated. In this manner, the mutual inductance between the two first coils can be increased. The structure arranged with a plurality of the first coils shown in FIG. 8 may be applicable to the secondary side unit LU2, or may be applied to both of the primary and secondary coil units LU1 and LU2. Also, a plurality of the second coils may be laminated to secure the mutual inductance.

5. Power Transmission Device and Power Reception Device

Figure 9:
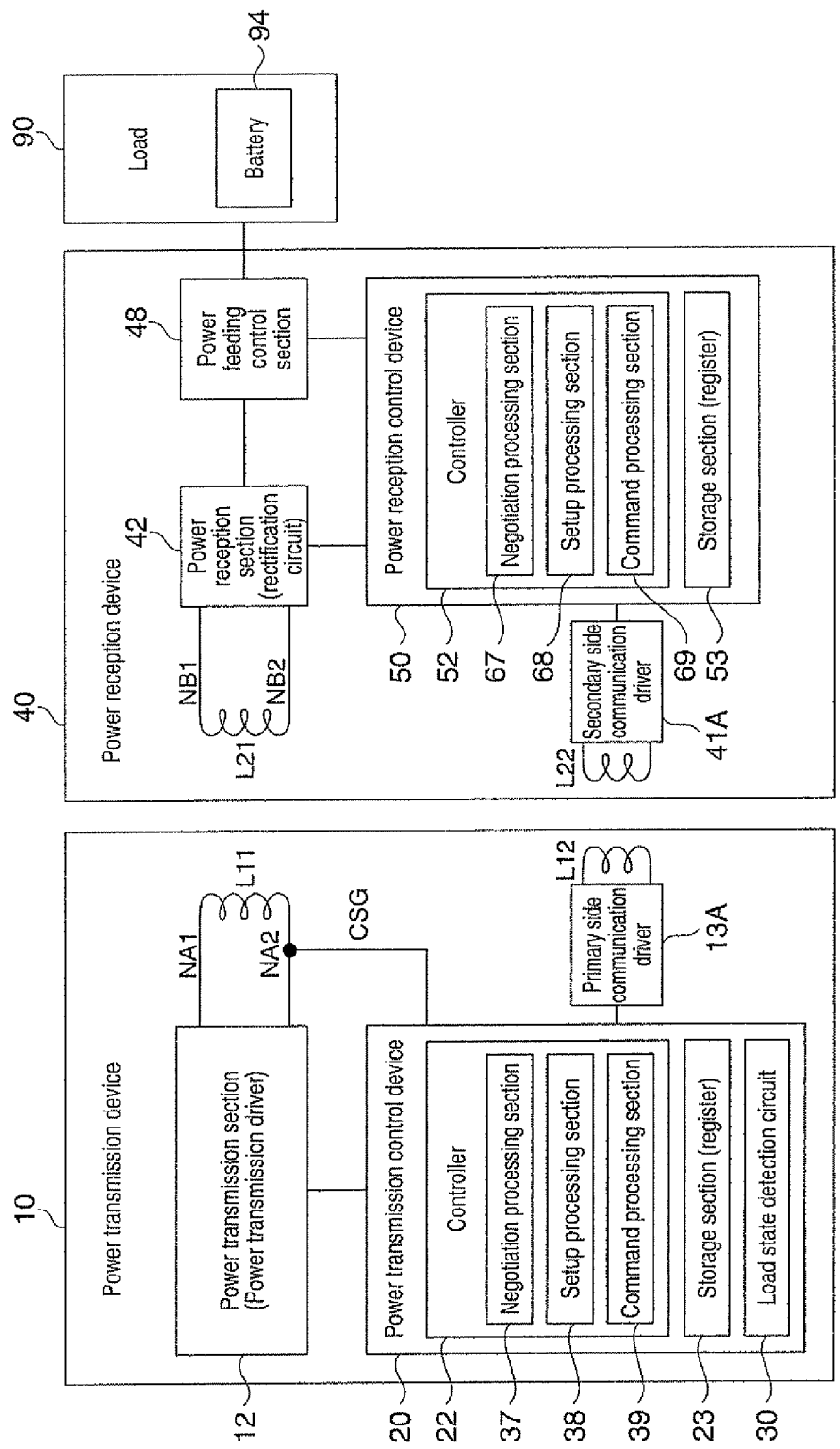
FIG. 9 is a diagram showing an exemplary composition of a power transmission device, a power transmission control device, a power reception device and a power reception control device in accordance with an embodiment of the invention.

FIG. 9 shows an exemplary composition of a power transmission device 10, a power transmission control device 20, a power reception device 40, and a power reception control device 50 in accordance with an embodiment of the invention. An electronic apparatus on the power transmission side such as the charge 500 shown in FIG. 1A includes the power reception device 10 having any of the coil arrangements shown in FIGS. 2-5, FIG. 7 and FIG. 8. An electronic apparatus on the power receiving side such as the portable telephone 510 may include the power reception device 40 and a load 90 (a main load). For example, by using the structure shown in FIG. 3, the first coils L11 and L21 are electromagnetically coupled with each other, thereby transmitting power from the power transmission device 10 to the power reception device 40, whereby a contactless power transmission (non-contact power transmission) system that supplies power to the load 90 is realized. Also, by electromagnetically coupling the second coils L12 and L22, communication can be performed between the power transmission device 10 and the power reception device 40. In accordance with the present embodiment, the entire data communication between the primary side and the secondary side is performed through the second coils L12 and L22 on the primary side and the secondary side.

The power transmission device 10 (a power transmission module, a primary module) may include a primary side first coil L11, a power transmission section 12, a primary side second coil L12, a primary side communication driver 13A and a power transmission control device 20.

The power transmission section 12 generates an AC voltage and supplies the same to the primary side first coil L11. Specifically, at the time of power transmission, the power transmission section 12 generates an AC voltage with a predetermined frequency, and supplies the AC voltage to the primary side first coil L11. The power transmission section 12 may includes, for example, a first power transmission driver for driving one end of the primary side first coil L11, a second power transmission driver for driving the other end of the primary side first coil L11, and at least one capacitor forming a resonance circuit together with the primary side first coil L11. Each of the first and second power transmission drivers included in the power transmission section 12 is an inverter circuit (a buffer circuit) composed of, for example, power MOS transistors, and is controlled by the power transmission control device 20.

The primary side first coil L11 (a coil on the power transmission side) is electromagnetically coupled to the secondary side first coil L21 (a coil on the power receiving side), thereby forming a power transmission transformer. For example, when power transmission is required, as shown in FIGS. 1A and 1B, the portable telephone 510 is placed on the charger 500 so that magnetic flux of the primary side first coil L11 passes through the secondary side first coil L21. On the other hand, when the power transmission is not required, the portable telephone 510 is physically separated from the charger 500 so that magnetic flux of the primary side first coil L11 does not pass through the secondary side first coil L21.

The power transmission control device 20 performs various controls of the power transmission device 10, and can be realized by an integrated circuit (IC) device or the like. The power transmission control device 20 may include a controller 22, a storage section 23 and a load state detection circuit 30. It is noted that various modifications, such as, omission of a part of the components above, addition of other components and the like can be made.

The controller 22 (on the power transmission side) controls the power transmission device 10 and the power transmission control device 20. The controller 22 can be realized by an ASIC circuit such as a gate array, a micro computer with a program operating on the micro computer, or the like. The controller 22 controls power transmission using the power transmission section 12, performs storage control of the storage section 23 and controls the load state detection circuit 30. Specifically, the controller 22 performs various sequence controls and judgment processings necessary for power transmission, load state detection (data detection, foreign object detection, removal detection and the like), frequency modulation and the like.

The storage section 23 (a register section) stores various information, and can be realized by, for example, RAMs, D flip-flops, or non-volatile memories such as flash memories, mask ROMs and the like.

The load state detection circuit 30 (a waveform detection circuit) detects a load state on the power receiving side (the power reception device or foreign objects). The load state detection can be realized by detecting variations in the waveform of an induced voltage signal (a coil terminal signal) of the primary side first coil L11. For example, a change in the load state (a load current) on the power receiving side (the secondary side) induces a change in the waveform of the induced voltage signal. The load state detection circuit 30 detects the change in the waveform, and outputs a detection result (detection result information) to the controller 22. Then, the controller 22, based on the detection information on the load state of the load state detection circuit 30, determines the load state (load fluctuation, a degree of the load) of the power receiving side (the secondary side).

The primary side communication driver 13A drives the primary side second coil L12 based on the control of the power transmission control device 20.

The power reception device 40 (a power receiving module, a secondary module) may include a secondary side first coil L21, a power receiving section 42, a secondary side second coil L22, a secondary side communication driver 41A, a power feeding control section 48, and a power reception control device 50.

The power receiving section 42 converts an alternate current (AC) induced voltage of the secondary side first coil L21 into a direct current (DC) voltage. This conversion can be realized by a rectification circuit included in the power reception section 42, and the like. The secondary side communication driver 41A drives the secondary side second coil L22 based on the control of the power reception control device 50.

The power feeding control section 48 controls a power feeding to the load 90. In other words, the power feeding control section 48 controls turning on and off the power feeding to the load 90. Specifically, the power feeding control section 48 regulates the level of the DC voltage from the power receiving section 42 (the rectifying circuit) so as to generate a power supply voltage, and supplies the power supply voltage to the load 90 so as to charge a battery 94 of the load 90. The load 90 may be a load without including the battery 94.

The power receiving control device 50 performs various controls of the power receiving device 40, and can be realized by an integrated circuit (IC) device, or the like. The power receiving control device 50 can be operated with a power supply voltage generated from the induced voltage of the secondary side first coil L21. Also, the power receiving control device 50 may include a controller 52, and a storage section 53.

The controller 52 (on the power receiving side) controls the power reception device 40 and the power reception control device 50. The controller 52 can be realized by an ASIC circuit such as a gate array, a micro computer with a program operating on the micro computer, or the like. The controller 52 controls the power feeding control section 48, and performs storage control of the storage section 53. Specifically, the controller 52 performs various sequence controls and judgment processings necessary for position detection, frequency detection, load modulation, full-charge detection and the like.

The storage section 53 (a register section) stores various information, and can be realized by RAMs, D flip-flops, or nonvolatile memories such as flash memories, mask ROMs and the like, for example.

In accordance with the present embodiment, the controller 22 on the power transmission side includes a negotiation processing section 37, a setup processing section 38, and a command processing section 39. Also, the controller 52 on the power receiving side includes a negotiation processing section 67, a setup processing section 68, and a command processing section 69. The controller may be structured without the command processing section 39 or 69.

The negotiation processing sections 37 and 67 perform a negotiation process for contactless power transmission through data communication through the second coils L12 and L22 on the primary side and the secondary side. That is, information on basic settings for contactless power transmission (a standard, a coil, a system, a safety feature, and the like) is exchanged between the power transmission side and the power receiving side. The setup processing sections 38 and 68, based on a result of the negotiation process, perform a setup process for contactless power transmission. That is, after the basic setting for contactless power transmission has been made in the negotiation process, setup information different from one apparatus and application to another is exchanged between the power transmission side and the power receiving side. The command processing sections 39 and 69 perform a command process for contactless power transmission after the setup process. In other words, basic commands and commands that become available in the setup process are issued and executed. It is noted that the controller 22 may start normal power transmission after the setup process without going through the command process. For example, normal power transmission may be started after the setup process without a specific command being issued.

Specifically, the negotiation processing section 37 on the power transmission side performs a confirmation process that confirms whether or not information can be communicated with the power reception device 40, a confirmation process that confirms whether or not the communicated information is adequate, and a confirmation process that confirms whether or not a load state on the power reception device is appropriate. More specifically, the negotiation processing section 37 confirms in the negotiation process as to whether information from the power receiving side can be properly received, whether the information received from the power receiving side is expected proper information, and whether the power receiving side is not a foreign object but a proper power reception device (a load). It is permissible not to perform, in the negotiation process, the confirmation process that confirms whether or not a load state on the power receiving side is appropriate.

More specifically, the negotiation processing section 37 performs a collation process that collates standard information, coil information, and system information indicative of a load state detection method with the power reception device 40. In other words, the standard/coil/system information received from the power receiving side is collated with the standard/coil/system information of the power transmission side to confirm whether or not the standard/coil/system information sets are compatible (matched).

The setup processing section 38, based on a result of the negotiation process, sets a transmission condition of contactless power transmission by data communication through the primary side and secondary side second coils L12 and L22. Specifically, when the power reception device 40 transmits transmission condition information of contactless power transmission, the setup process section 38 receives the transmission condition information and sets the transmission condition of the contactless power transmission. That is, when the power reception device 40 transmits transmission condition information, such as, a driving voltage and a driving frequency of a coil, necessary for normal power transmission, the setup process section 38 sets a transmission condition such as the driving voltage and the driving frequency based on the transmission condition information. Also, the setup process section 38 exchanges setup information that may be different from one apparatus and application to another with the power reception device 40.

After the setup process, the command processing section 39 processes various commands such as a normal power transmission start command, a full-charge detection command for the battery 94 (a full charge notifying command), and a recharge confirmation command for the battery 94. In other words, the command process section 39 issues and executes these commands. It is noted that only at least the normal power transmission start command among the commands may be prepared, and the other commands may be treated as optional commands. Communication of the commands between the primary side and the secondary side is performed by data communication through the second coils L12 and L22 on the primary side and the secondary side.

After the normal power transmission from the power transmission device 10 to the power reception device 40 has been started, the controller 22 stops the normal power transmission in response to a power transmission stop request from the power reception device 40. For example, after the start of normal power transmission, when a full-charge state of the battery 94 is detected, the normal power transmission is stopped. Specifically, when the power receiving side detects a full-charge state of the battery 94, it transmits a full-charge detection command by data communication through the second coils L12 and L22 on the primary side and the secondary side. Upon receiving the full-charge detection command, the normal power transmission that has been started by the normal power transmission start command is stopped.

Then the controller 22, when it stopped the normal power transmission upon the full-charge detection, proceeds to a standby phase after the full-charge detection. That is, after detection of the full-charge state of the battery 94, the control section 22 waits until recharging of the battery 94 becomes necessary. At this time, because the normal power transmission from the power transmission side has stopped, the power supply voltage is not supplied, and the power reception device 40 proceeds to a reset state.

In the standby phase after the full-charge detection, the controller 22 confirms recharging of the battery. Specifically, for example, the controller 22 performs a temporary power transmission at each predetermined period to release the reset state of the power reception device 40, and issues a recharge confirmation command to confirm whether or not the battery 94 needs to be recharged. At this time, in the standby phase after the full-charge detection, a recharge confirmation flag is not cleared but maintained in a set state. In other words, by maintaining the recharge confirmation flag in a set state, the recharge confirmation command can be executed at a command branching after the negotiation phase and the setup phase.

On the other hand, when removal of the electronic apparatus on the power receiving side is detected in the standby phase after the full-charge detection, the process sequence proceeds to a standby phase after the removal detection, and the recharge confirmation flag is cleared in this case. Then, when placement of the electronic apparatus on the power receiving side (placement of the electronic apparatus onto the charger) is detected in the standby phase after the removal detection, the process sequence proceeds to a negotiation process phase. Then, for example, after proceeding through the phases of the setup process and the like, the normal power transmission is started.

The negotiation process section 67 on the power receiving side performs a confirmation process that confirms whether or not information can be communicated with the power transmission device 10, and a confirmation process that confirms whether or not the communicated information is adequate. Specifically, a collation process that collates standard information, coil information, and system information indicative of a load state detection method is performed. The negotiation process section 67 transmits standard/coil/system information to the power transmission side, receives standard/coil/system information from the power transmission side, and confirms whether or not the standard/coil/system information on the power transmission side and the standard/coil/system information on the power reception side are compatible (matched).

The setup process section 68, based on a result of the negotiation process, transmits transmission condition information of contactless power transmission to the power transmission device 10. Specifically, transmission condition information, such as, the driving voltage and the driving frequency of the coil, necessary for normal power transmission is transmitted. Further, setup information that differs from one apparatus and application to another is exchanged with the power transmission device 10.

After the setup process, the command processing section 69 performs processings of various commands, such as, a normal power transmission start command, a full-charge detection command for the battery 94, a recharge confirmation command for the battery 94 and the like. In other words, the command processing section 69 issues and executes these commands. It is noted that the controller 52 may start power supply to the load 90, after the setup process, when the normal power transmission from the power transmission device 10 to the power reception device 40 is started, without proceeding through the command process. For example, power supply to the load 90 may be started after the setup process without a specific command being issued.

6. Process Sequence of Contactless Power Transmission

Figure 10:
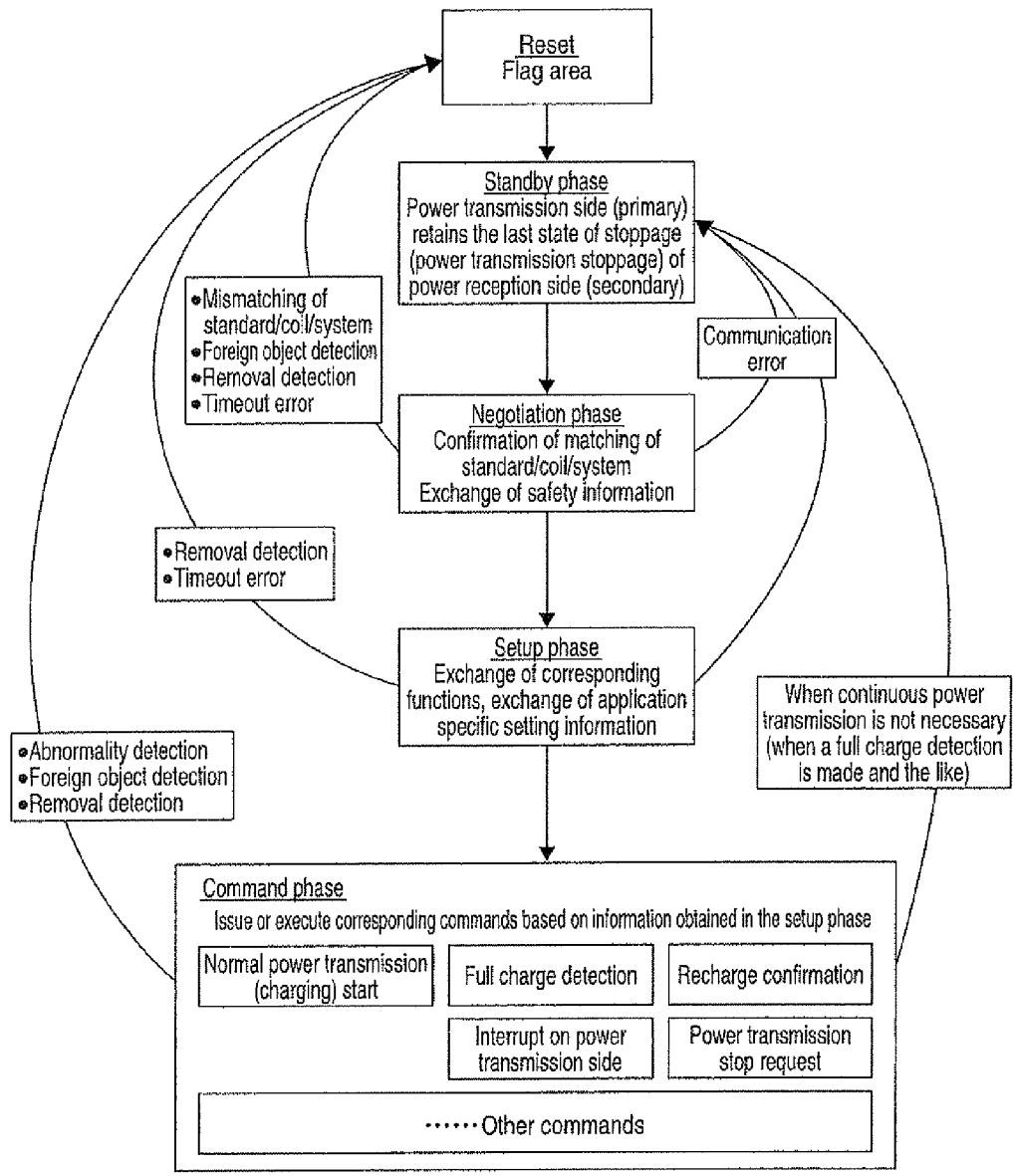
FIG. 10 is a chart explaining a processing sequence of the contactless power transmission in accordance with an embodiment of the invention.

FIG. 10 schematically shows an outline of a processing sequence of the contactless power transmission that is realized in accordance with an embodiment of the invention.

The process sequence proceeds to a standby phase after a reset state. In the reset state, various flags retained by the power transmission side (the primary side) and the power receiving side (the secondary side) are cleared. Here, the flags represent conditions of the power transmission device and the power receiving device (a power transmission state, a full charge state, a recharge confirmation state, and the like), and kept in the storage sections of the devices.

In the standby phase, the power transmission side (the primary side) maintains the last state of the power receiving side (the secondary side) at the time of stoppage (at the time at which power transmission is stopped). For example, if a full charge of the battery is detected, the power transmission side and the power receiving side proceed to the standby phase after the full charge. In this case, since the battery needs to be recharged through detecting a battery voltage drop, the power transmission side stores that the power transmission stop is due to the full charge detection. Specifically, the recharge confirmation flag is maintained in a set state without being cleared, so as to periodically confirm whether or not the recharge is required.

In the standby phase, power transmission from the power transmission side to the power receiving side is stopped. As a result, a power supply voltage is not supplied to the power receiving side, so that the power receiving side is placed in a stop state while a power supply voltage is supplied to the power transmission side, so that the power transmission side is in an operating state. In this manner, the power receiving side stops the operation in the standby phase, whereby lower power consumption is achieved. At this time, the power transmission side maintains flags for various states without clearing them, so that the power transmission side can perform various processes by using the flags after the standby phase.

The power transmission side and the power receiving side proceed to a negotiation phase after the standby phase. In the negotiation phase, a negotiation process is performed in which matching of standards/coils/systems is confirmed and safety information is exchanged. Specifically, the power transmission side and the power receiving side exchange standard/coil/system information so as to confirm whether or not their standards/coils/systems are compatible. In addition, for example, safety threshold information for detecting foreign objects and the like is transmitted from the power receiving side to the power transmission side so as to exchange information on safety. The negotiation process confirms as to whether or not information can be communicated between the power transmission side and the power receiving side, whether or not the communicated information is adequate, whether or not a load state on the power receiving side is appropriate (if foreign objects are not detected), and the like.

If, in the negotiation process, mismatching of standards/coils/systems is determined, a foreign object is detected, removal of the apparatus is detected, or a timeout error occurs, the sequence proceeds to the reset state, and the various flags are cleared. On the other hand, if a communication error or the like occurs, the sequence proceeds to the standby phase, for example, and the flags are not cleared.

The power transmission side and the power receiving side proceed to the setup phase after the negotiation phase. In the setup phase, a setup process is performed in which setup information such as information on corresponding functions and application specific setup information is transferred. For example, based on a result of the negotiation process, the transmission condition for contactless power transmission is specified. Specifically, if the power receiving side transmits transmission condition information such as the driving voltage and the driving frequency of the coil to the power transmission side, the power transmission side sets a transmission condition such as the driving voltage and the driving frequency of the coil for normal power transmission based on the received transmission condition information. In addition, information on corresponding functions and setup information that is different from one upper level application to another are also exchanged in the setup process. Specifically, in the setup process, information on kinds of commands that can be issued and executed by the power transmission side and the power receiving side in the command phase, and information on additional corresponding functions such as a periodic authentication function and the like are exchanged. Accordingly, it is possible to exchange setup information that is different from one application to another, such as the type of each electric apparatus (whether it is a portable telephone, audio equipment, or the like) and the model thereof.

If removal of the apparatus is detected or a timeout error occurs in the setup process, the sequence proceeds to the reset state. On the other hand, if a communication error or the like occurs, the sequence proceeds to the standby phase.

The power transmission side and the power receiving side proceed to the command phase after the setup phase. In the command phase, a command process is performed based on the information obtained in the setup process. In other words, a corresponding command (confirmed that it can correspond, in the setup process) is issued or executed. The command to be executed in the command process include, for example, a normal power transmission (charging) start command, a full charge detection (notifying) command, a recharge conformation command, a power receiving side interrupt command, and a power transmission stop request command.

For example, when normal power transmission is ready after the negotiation process and the setup process, the power transmission side transmits (issues) the normal power transmission (charging) start command to the power receiving side. Then, the power receiving side receives the command and transmits a reply command to the power transmission side. As a result, the normal power transmission starts. If a full charge is detected on the power receiving side after the start of the normal power transmission, the power receiving side transmits the full charge detection command to the power transmission side.

If continuous power transmission is not required, such as the full charge detection, the sequence proceeds to the standby phase after the full charge detection. After going through the negotiation process and the setup process again, the power transmission side transmits the recharge confirmation command to the power receiving side. Then, the power receiving side checks a battery voltage to determine whether or not recharging of the battery is required. If recharging is required, the recharge confirmation flag is reset, and the power transmission side issues the normal power transmission start command. As a result, the normal power transmission restarts. On the other hand, if recharging of the battery is not required, the recharge confirmation flag is maintained in the set state, and then the sequence returns to the standby phase after the full-charge detection.

If any abnormality, a foreign object, or removal is detected in the command process, the sequence proceeds to the reset state.

Figure 11:
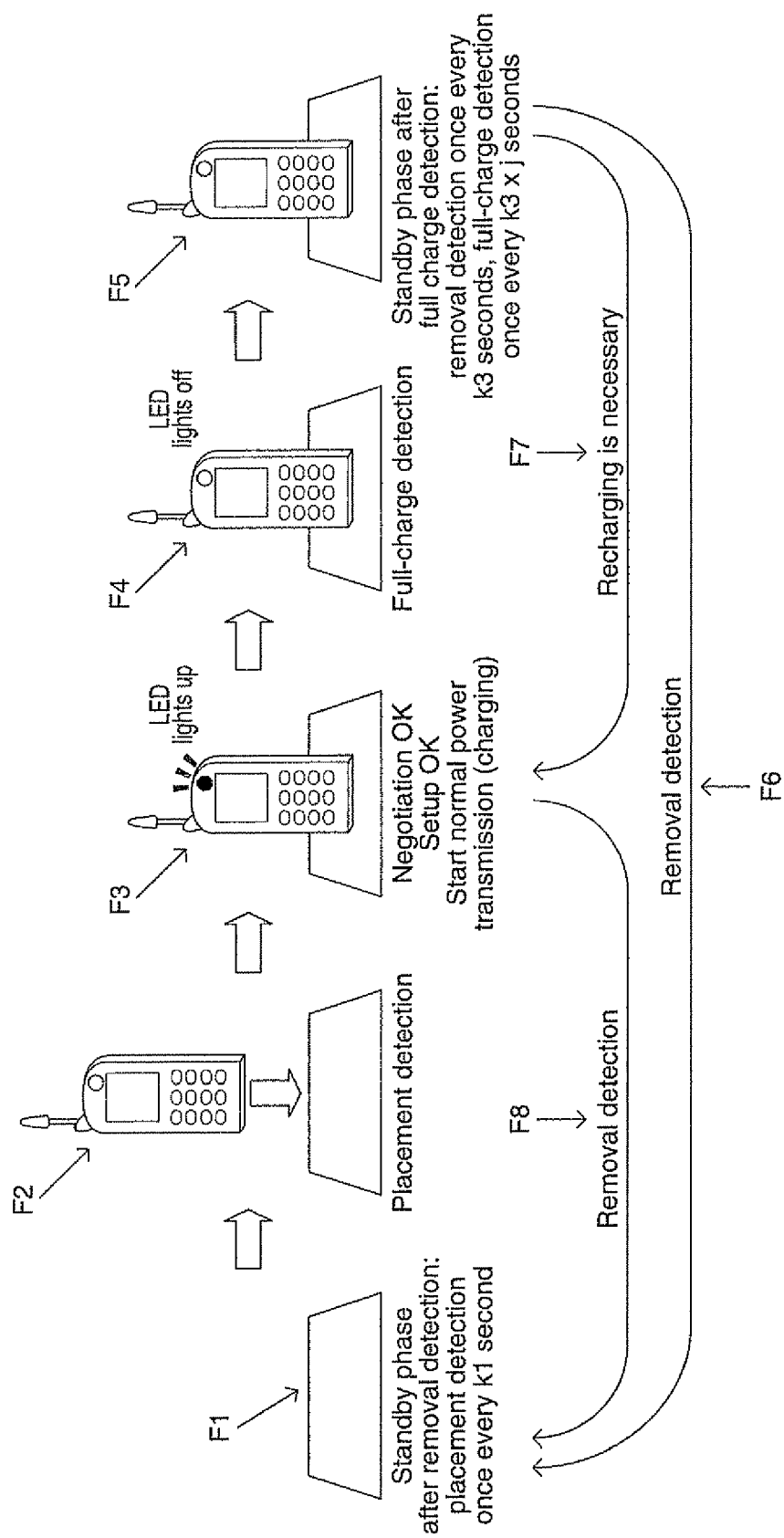
FIG. 11 is an illustration explaining a processing sequence of the contactless power transmission in accordance with an embodiment of the invention.

The process sequence according to the embodiment is more specifically described with reference to FIG. 11. In the standby phase after the removal detection shown in F1, placement detection is performed once every k1 seconds, for example. As shown in F2, if placement (mounting) of the electronic apparatus is detected, the negotiation process and the setup process are performed. As shown in F3, if the negotiation process and the setup process are normally ended, and the normal power transmission start command is issued in the command process, the normal power transmission starts so as to start charging the electronic apparatus. As shown in F4, if a full charge is detected, an LED on the electronic apparatus is turned off. Then, the sequence proceeds to the standby phase after the full charge detection as shown in F5.

In the standby phase after the full charge detection, removal detection is performed once every k3 seconds and recharge confirmation is performed once every k3×j seconds. Then, in the standby phase after the full charge detection, if removal of the electronic apparatus is detected as shown in F6, the process sequence proceeds to the standby phase after the removal detection. On the other hand, in the standby phase after the full charge detection, if it is determined that recharging is necessary by the recharge confirmation as shown in F7, the negotiation process and the setup process are performed. Then, the normal power transmission is restarted so as to start recharging the battery. If removal of the electric apparatus is detected during the normal power transmission as shown in F8, the process sequence proceeds to the standby phase after the removal detection.

FIG. 12A shows an exemplary format of a negotiation frame to be transmitted in the negotiation process. The negotiation frame has a head field, an information field and an end field. Further, the information field is composed of a matching code and a hardware information code.

FIG. 12B shows an exemplary format of the matching code. The matching code is composed of a command ID, a standard code, an extension code and a coil code.

The command ID is an ID representing a matching code. The standard code is a code representing the version of the standard. The extension code is a code representing the ID code system. For example, a code length is managed by, for example, an extension code management ledger or the like.

The coil code is a code representing coil information, and for example, includes a classification code and a coil ID (coil identification information). The classification code is used for designating an administrator of the coil ID. The coil ID is given to the primary coil (a primary coil unit) by the administrator. That is, an ID of the primary coil on the power transmission side is not only given to the power transmission side but also to the power receiving side as a coil ID. The definition of the coil ID changes depending on the extension code. For example, if the extension code is a first setting, the coil code is set being divided into the classification code and the coil ID. On the other hand, if the extension code is a second setting, the coil code is set without being divided into the classification code and the coil ID.

FIG. 12C shows an exemplary format of the hardware information code. The hardware information code includes a system code and a foreign object threshold. The system code indicates system information, and specifically is information indicating a method for detecting load conditions on the power transmission side and the power receiving side. Examples of the method for detecting a load condition include a pulse width detection method (a phase detection method), a current detection method, a peak voltage detection method, and a combination thereof. The system code indicates as to which one of the methods is employed by the power transmission side and the power receiving side.

The foreign object threshold is safety threshold information. The foreign object threshold is, for example, stored in the power receiving side, and is transmitted from the power receiving side to the power transmission side before the normal power transmission is started. The power transmission side, based on the foreign object threshold, performs first foreign object detection that is foreign object detection before the normal power transmission is started. For example, if a load condition on the power receiving side is detected by the pulse width detection method, a threshold of a pulse width count value is transmitted from the power receiving side to the power transmission side as a foreign object threshold. Based on the threshold of the pulse width count value, the power transmission side performs the first foreign object detection by the pulse width detection method.

According to the process sequence of the embodiment, the compatibility of standard/coil/system is determined and the minimum safety information is exchanged in the negotiation process. Further, in the negotiation process, the possibility of communication and the adequacy of the communication information are determined as well as the propriety of a load condition of the power receiving device is determined.

In the setup process, a transmission condition required for the normal power transmission is set up. For example, the driving voltage and the driving frequency of the coil are set. In addition, information on additional corresponding function and setup information required for each upper level application are exchanged in the setup process.

After going through the setup process and the negotiation process, the sequence proceeds to the command phase so as to perform the command process. Specifically, a command confirmed that it is available in the negotiation process is issued or executed in the command process.

Accordingly, the minimum information required for securing the compatibility and the safety of the system is exchanged in the negotiation process, and setup information different from one application to another is exchanged in the setup process. Accordingly, if the information on the power transmission side is not compatible with that of the power receiving side, it is excluded in the negotiation process, such that the setup information having a large volume of information may not be transferred. In the negotiation process, only the minimum amount of information is transferred, whereby an amount of transferred information can be reduced, and thus the negotiation phase can be ended in a short time, achieving a more efficient process.

Each apparatus on the power transmission side and the power receiving side can perform a minimum contactless power transmission by the negotiation process, and each apparatus can expand the functions by exchanging the setup information. Each apparatus makes the minimum setting required for a contactless power transmission system in the negotiation process, and the system can be optimized in the setup process. As a result, a flexible system can be realized.

The power transmission side receives threshold information and system information from the power receiving side, and can realize contactless power transmission and foreign object detection by only setting the received threshold information and the system information. Therefore, the processes on the power transmission side can be simplified. In this case, the power receiving side transmits coil information of an appropriate combination and threshold information to the power transmission side, so that appropriate and safe contactless power transmission can be realized.

7. Transmission and Reception of Coil Information

When contactless power transmission becomes widely popular, it is predicted that various types of secondary side first coils L21 on the power receiving side may be placed on the market. That is, as electronic apparatuses, such as, portable telephones, come in various exterior configurations and sizes, secondary side first coils L21 built in power reception devices of electronic apparatuses would also come in various external configurations and sizes. Moreover, as power rates (a watt-hour) and output voltages of contactless power transmission required for electronic apparatuses differ from one apparatus to another, the inductances of the secondary side first coils L21 would differ from one to the other accordingly.

On the other hand, in contactless power transmission, power may be transmitted even when shapes and sizes of the first coils on the primary side and the secondary side do not perfectly match one another. In this respect, a charging system that uses a wired cable can prevent such an incident as described above by devising the shape of the connecter of the cable or the like. However, it is difficult to make such contrivance on contactless power transmission.

In this case, as in JP-A-2006-60909, it may be possible to use a method in which a device ID of a power reception device is transmitted to a power transmission device, and the power transmission device uses the device ID to perform an ID authentication.

However, the method of the related art described above is provided only on the assumption that a single power transmission device corresponds to a single power receiving device, and thus is not provided on the assumption that one primary coil needs to cope with various types of secondary coils. Therefore, it would be difficult to cope with a situation where various types of the secondary coils are placed on the market. Namely, if one primary side first coil L11 needs to accommodate plural types of secondary side first coils L21, the power transmission side needs to store a plurality of device IDs, resulting in complication in their management.

Therefore the present embodiment uses a method in which the storage section 23 on the power transmission side stores information about the power transmission side coil and the storage section 53 on the power receiving side stores information about the power receiving side coil, and the coil information is mutually communicated between the power transmission side and the power receiving side. By using such a method, the situation where various types of secondary side first coils L21 become available can be accommodated without resulting in much complication in their management.

8. Operation

Next, operations of the embodiment will be described in detail. First, the power transmission device 10 starts temporary power transmission (power transmission for detecting a position) before the start of normal power transmission. With this temporary power transmission, a power supply voltage is supplied to the power reception device 40, through mutual electromagnetic coupling of the primary side and secondary side first coils L11 and L21, so that the power reception device 40 is turned on. The power receiving device 40, for example, determines whether or not a positional relation between the primary side first coil L11 and the secondary side first coil L21 is appropriate. Specifically, the power receiving device 40 determines whether or not the positional relation between the primary side first coil L11 and the secondary side first coil L21 is that is shown in FIG. 1B or in FIG. 4, for example.

If the positional relation between the first coils L11 and L21 is determined to be appropriate, the power reception device 40 (the negotiation processing section 67) makes a negotiation frame so as to transmit it to the power transmission device 10. The negotiation frame is transmitted through electromagnetic coupling between the primary side and secondary side second coils L12 and L22. The negotiation frame includes, for example, standard/coil/system information, and threshold information.

Upon receiving the negotiation frame from the power reception device 40 through the primary side and secondary side second coils L12 and L22, the power transmission device 10 (the negotiation processing section 37) collates the standard/coil/system information on the power receiving side included in the received negotiation frame with standard/coil/system information on the power transmission side stored in the storage section 23. That is, processing to confirm the possibility of communication, and processing to confirm the appropriateness of communication information are performed. Also, the threshold information received from the power reception device 40 is set as threshold information for detecting a load state on the power receiving side.

Next, the power transmission device 10, based on the threshold information received from the power receiving device 40, detects whether or not a foreign object is inserted between the primary side first coil L11 and the secondary side first coil L21. In other words, it is conformed as to whether or not a load state on the power receiving side is proper. If it is determined that the standard/coil/system information on both sides are compatible (matched) and no foreign objects are detected, the power transmission device 10 makes a negotiation frame including standard/coil/system information on the power transmission side, and transmits the same to the power reception device 40 through the primary side and secondary side second coils L12 and L22.

The power reception device 40, then, collates standard/coil/system information on the power receiving side with the standard/coil/system information of the received negotiation frame. Then, the power reception device 40 (the setup processing section 68) makes a setup frame, and transmits the same to the power transmission device 10 through the primary side and secondary side second coils L12 and L22. The setup frame includes, for example, transmission condition information such as the drive voltage and the drive frequency of the coil, corresponding function information indicative of functions (commands and the like) corresponding to those of the power receiving side, and the like.

Upon receiving the setup frame, the power transmission device 10 (setup processing section 38), based on the transmission condition information received from the power receiving side, sets a transmission condition for normal power transmission. Also, based on the received corresponding function information on the power receiving side, the power transmission device 10 determines whether the corresponding functions on the power transmission side and the power receiving side match each other. The power transmission device 10 makes a setup frame including the corresponding function information on the power transmission side, and transmits the same to the power reception device 40 through the primary side and secondary side second coils L12 and L22. Then, the power receiving side, based on the received corresponding function information on the power transmission side, determines whether the corresponding functions on the power transmission side and the power receiving side match each other.

Then, a command process is performed based on a result of the setup process. Specifically, the power transmission device 10 (the command processing section 39) and the power reception device 40 (the command processing section 69) issue or execute corresponding commands.

For example, in the case of performing normal power transmission (charging), the power reception device 40 transmits a start frame to the power transmission device 10 through the second coils L12 and L22 on the primary side and the secondary side. Then, the power transmission device 10 issues a normal power transmission start command (a charge start command), and transmits the same to the power reception device 40 through the primary side and secondary side second coils L12 and L22, and the power reception device 40 transmits a reply command responding to the normal power transmission start command to the power transmission device 10 through the primary side and secondary side second coils L12 and L22. By this, the command process for normal power transmission is executed by the power transmission device 10 and the power reception device 40.

Specifically, the power transmission device 10 starts normal power transmission to the power reception device 40 through the primary side and secondary side first coils L11 and L21. In this case, the drive voltage and the drive frequency of the coil set in the setup frame described above are used.

If a fill charge of the battery 94 is detected after the start of normal power transmission, the power reception device 40 issues a full charge detection command for notifying of the detection of the full charge to the power transmission device 10. Specifically, the power reception device 40 makes a save frame including the full charge detection command, and transmits the same to the power reception device 10 through the primary side and secondary side second coils L12 and L22. As a result, the power transmission device 10 stops the power transmission to the power reception device 40, and proceeds to a standby phase after the full charge detection. This standby phase is a phase to confirm at a predetermined period as to whether or not recharging of the battery 94 is necessary.

The power transmission device 10 sets a recharge confirmation flag to 1 when the necessity of recharging is confirmed. Specifically, in the standby phase after the full charge detection, the recharge confirmation flag is maintained in a set state without being cleared. Then the power transmission device 10 starts temporary power transmission to the power reception device 40, and performs the negotiation process, the setup process and the command process.

Then, by a command branch in the command process, the power transmission device 10 issues a recharge confirmation command, and transmits the same to the power reception device 40 through the primary side and secondary side second coils L12 and L22. By this, the power reception device 40 confirms the battery voltage (charged voltage) of the battery 94. Upon determining that recharging is necessary, the power reception device 40 transmits a charge start command through the primary side and secondary side second coils L12 and L22. Then the power transmission device 10 resets a recharge confirmation flag to 0, and after the negotiation process, the setup process and the command process, starts normal power transmission.

When removal of the electronic apparatus on the power receiving side is detected in the standby phase after the full charge detection, the power transmission to the power reception device 40 is stopped, and the process sequence proceeds to a standby phase after the removal detection. In this case, the recharge confirmation flag is reset to 0, and the process sequence proceeds to a reset state.

Then, in the standby phase after the removal detection, if placement of the electronic apparatus on the power receiving side is detected, the process sequence proceeds to a negotiation processing phase. Then, the setup process and the command process are executed, and then normal power transmission is started, for example. By this, charging of the battery 94 of the electronic apparatus placed is started.

As described above, in accordance with the present embodiment, after the negotiation processing, the setup process is executed, and then the command process is executed, whereby a sequence processing is executed. As a result, the minimum amount of information necessary for securing the system compatibility and the safety is exchanged in the negotiation process, and setup information that is different from one application and apparatus to another can be exchanged in the setup process. This makes it possible to provide a contactless power transmission system with high versatility and higher processing efficiency. Further, as the minimum setting required for a contactless power transmission system is performed in the negotiation process, and the system can be optimized in the setup process. As a result, a flexible system can be realized.

9. Detailed Exemplary Structure

Figure 13:
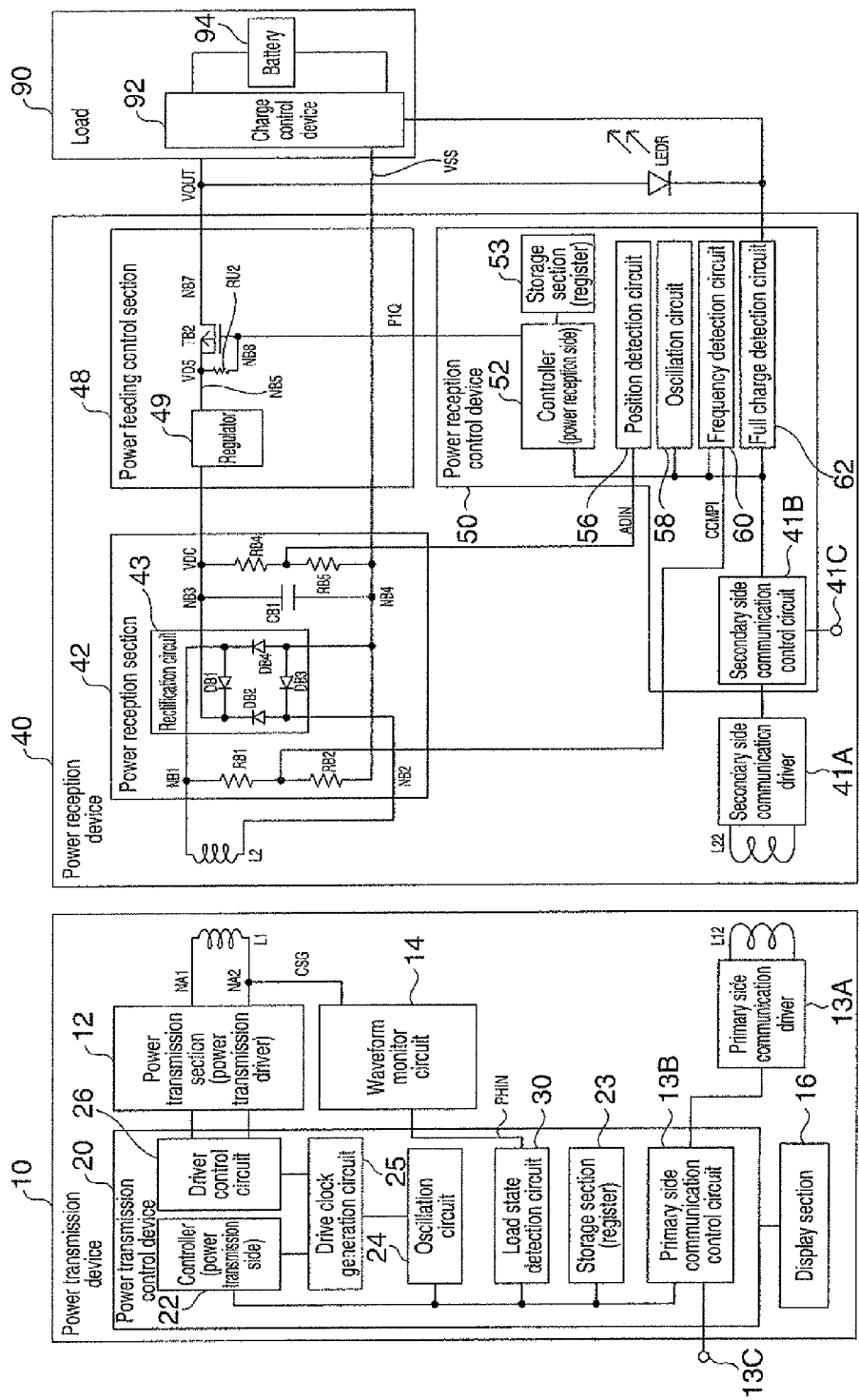
FIG. 13 is a diagram showing a detailed exemplary composition of a power transmission device, a power transmission control device, a power reception device and a power reception control device in accordance with an embodiment of the invention.

A detailed structural example of the embodiment is shown in FIG. 13. Hereinafter, the components described in FIG. 9 are appended with the same numerals and the description thereof is omitted, if appropriate.

A primary side communication driver 13A that drives a primary side second coil L12 is connected to a primary side communication control circuit 13B provided in the power transmission control device 20. The primary side communication control circuit 13B is connected to a power transmission side control section 22 and a storage section 23 of the power transmission device 10, as well as to an I/O port 13C. That is, the primary side communication control circuit 13B performs data communication necessary for power transmission control between the primary side and the secondary side described above, and converts electronic data from outside to data communication modes using the primary side and secondary side second coils L12 and L22, thereby performing transmission control on data unrelated to power transmission.

On the other hand, a secondary side communication driver 41A that drives the secondary side second coil L22 is connected to a secondary side communication control circuit 41B provided on the power reception control device 40. The secondary side communication control circuit 41B is connected to a power receiving side control section 52 of the power reception device 40, to a storage section 53 through the power receiving side control section 52, and to an I/O port 41C. In other words, the secondary side communication control circuit 41B performs data communications required for the transmission control between the primary side and the secondary side described above, and is also capable of transmitting data unrelated to power transmission from the primary side to a main body control section of the portable telephone 510.

As a result, during a charge operation of charging the portable telephone 510 in a state in which the portable telephone 510 is mounted on the charger 500 as shown in FIG. 1A, or after the charge operation, various data and images can be transmitted to the portable telephone 510 through an apparatus, such as, an internet apparatus connected to the charger 500. As an example of such data communications, information of advertisement of a shop where the charger 500 is placed, local area information and the like may be communicated.

A waveform monitor circuit 14 (a rectification circuit), based on a coil terminal signal CGS of the primary side first coil L11, generates an induced voltage signal PHIN for a waveform monitor. For example, the coil terminal signal CGS that is an induced voltage signal of the primary side first coil L11 may exceed a maximum rating voltage of an IC of the power transmission control device 20 or have a negative voltage. The waveform monitor circuit 14 receives the coil terminal signal CGS, generates the induced voltage signal PHIN for a waveform monitor, which can be detected as a waveform by the load state detection circuit 30 of the power transmission control device 20, and outputs the same to, for example, a terminal for a waveform monitor of the power transmission control device 20. A display 16 displays various states (in power transmitting, ID authenticating, and the like) of the contactless power transmission system with colors, images, and the like.

An oscillation circuit 24 generates a clock for the primary side. A driving clock generation circuit 25 generates a driving clock defining the driving frequency. A driver control circuit 26 generates a control signal with a desired frequency based on the driving clock from the driving clock generation circuit 25 and a frequency setting signal from the controller 22. Then, the driver control circuit 26 outputs the control signal to first and second power transmission drivers of the power transmission section 12, thereby controlling the first and the second power transmission drivers.

The load state detection circuit 30 shapes a waveform of the induced voltage signal PHIN so as to generate a waveform shaped signal. For example, the load state detection circuit 30 generates a waveform shaped signal (a pulse signal) of a square wave (a rectangular wave) that becomes active (e.g., H level) if the signal PHIN exceeds a given threshold voltage. The load state detection circuit 30 detects pulse width information (a pulse width period) of the waveform shaped signal based on the waveform shaped signal and the driving clock. More specifically, the load state detection circuit 30 receives the waveform shaped signal and the driving clock from the driving clock generation circuit 25, and detects the pulse width information of the waveform shaped signal, thereby detecting the pulse width information of the induced voltage signal PHIN.

It is noted that the load state detection circuit 30 may employ any one of various methods such as the current detection method and the peak voltage detection method, without any particular limitation to the pulse width detection method (phase detection method).

The controller 22 (the power transmission control device), based on a detection result in the load state detection circuit 30, determines a load state (load fluctuation, a degree of the load) of the power receiving side (the secondary side). For example, the controller 22, based on the pulse width information detected in the load state detection circuit 30 (a pulse width detection circuit), determines a load state on the power receiving side so as to perform, for example, a foreign object (metal) detection, a removal (placement and removal) detection, and the like. That is, a pulse width period that is pulse width information of the induced voltage signal varies in accordance with the variation of the load state on the power receiving side. The controller 22 can detect load fluctuation on the power receiving side based on the pulse width period (a count value obtained by measuring the pulse width period).

The power receiving section 42 converts an alternating induced voltage of the secondary side first coil L21 into a DC voltage. This conversion is performed by a rectification circuit 43 included in the power receiving section 42.

During temporary power transmission, a transistor TB2 of the power feeding control section 48 is turned off. As a result, the load 90 is in a state of not being electrically coupled to the power receiving device 40.

The power feeding control section 48 controls power feeding to the load 90. A regulator 49 regulates a voltage level of a DC voltage VDC obtained by the conversion in the rectification circuit 43 so as to generate a power supply voltage VD5 (e.g., 5V). The power receiving control device 50 operates with a supply of the power supply voltage VD5, for example.

The transistor TB2 (a P-type CMOS transistor, a power feeding transistor) is controlled by a signal P1Q from the controller 52 of the power receiving control device 50. Specifically, the transistor TB2 is turned off during the temporary power transmission period, and turned on in other periods.

A position detection circuit 56 determines whether or not a positional relation between the primary side first coil L11 and the secondary side first coil L21 is appropriate. An oscillation circuit 58 generates a clock for the secondary side. A frequency detection circuit 60 detects frequencies (f1, f2) of a signal CCMPI. A full charge detection circuit 62 detects whether or not the battery 94 (a secondary battery) of the load 90 is in a full charge state (a charged state).

The load 90 may include a charge control device 92 controlling a charge and the like of the battery 94. The charge control device 92 (a charge control IC) can be realized by an integrated circuit device or the like. The battery 94 may be provided itself with a function of the charge control device 92, like a smart battery.

Data communication using the primary side and secondary side second coils L12 and L22 is realized by a frequency modulation, for example.

Figure 14A:
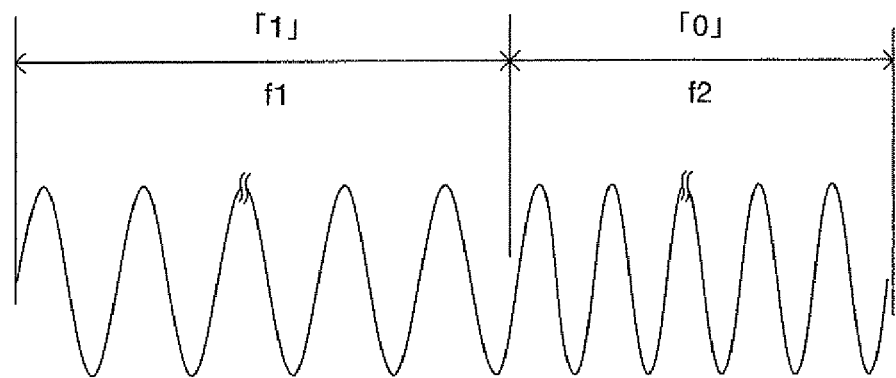
FIGS. 14A and 14B are views explaining a data communication operation by frequency modulation and a load state detection operation by load modulation.

Specifically, as shown in FIG. 14A, for example, the communication driver 13A on the primary side generates an AC voltage with a frequency f1 when transmitting data "1" to secondary side, and an AC voltage with a frequency f2 when transmitting data "0." The frequency detection circuit 60 on the power receiving side detects a change in the frequency thereby judging the data "1" or "0." As a result, data communication by the frequency modulation between the primary side and the secondary side can be realized.

It is noted however that data communication using the primary side and secondary side second coils L12 and L22 may be realized by another method such as pulse width modulation, pulse communication, without any particular limitation to the frequency modulation.

Figure 14B:
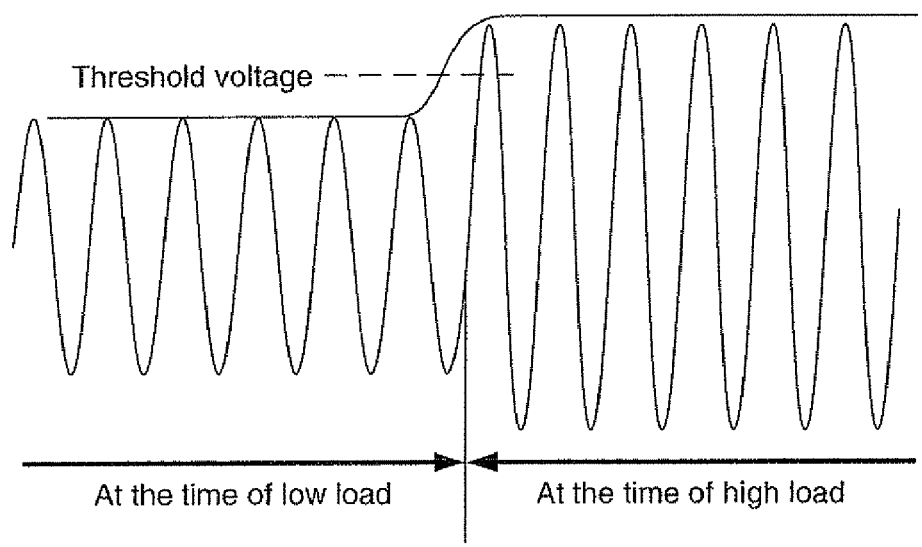

The load state detection circuit 30 determines a load state based on a change in the signal waveform of the induced voltage of the primary side first coil L11, as indicated in FIG. 14B, whereby a foreign object detection is made in a high load state, and a removal detection is made in a low load state.

10. Operation

Figure 15:
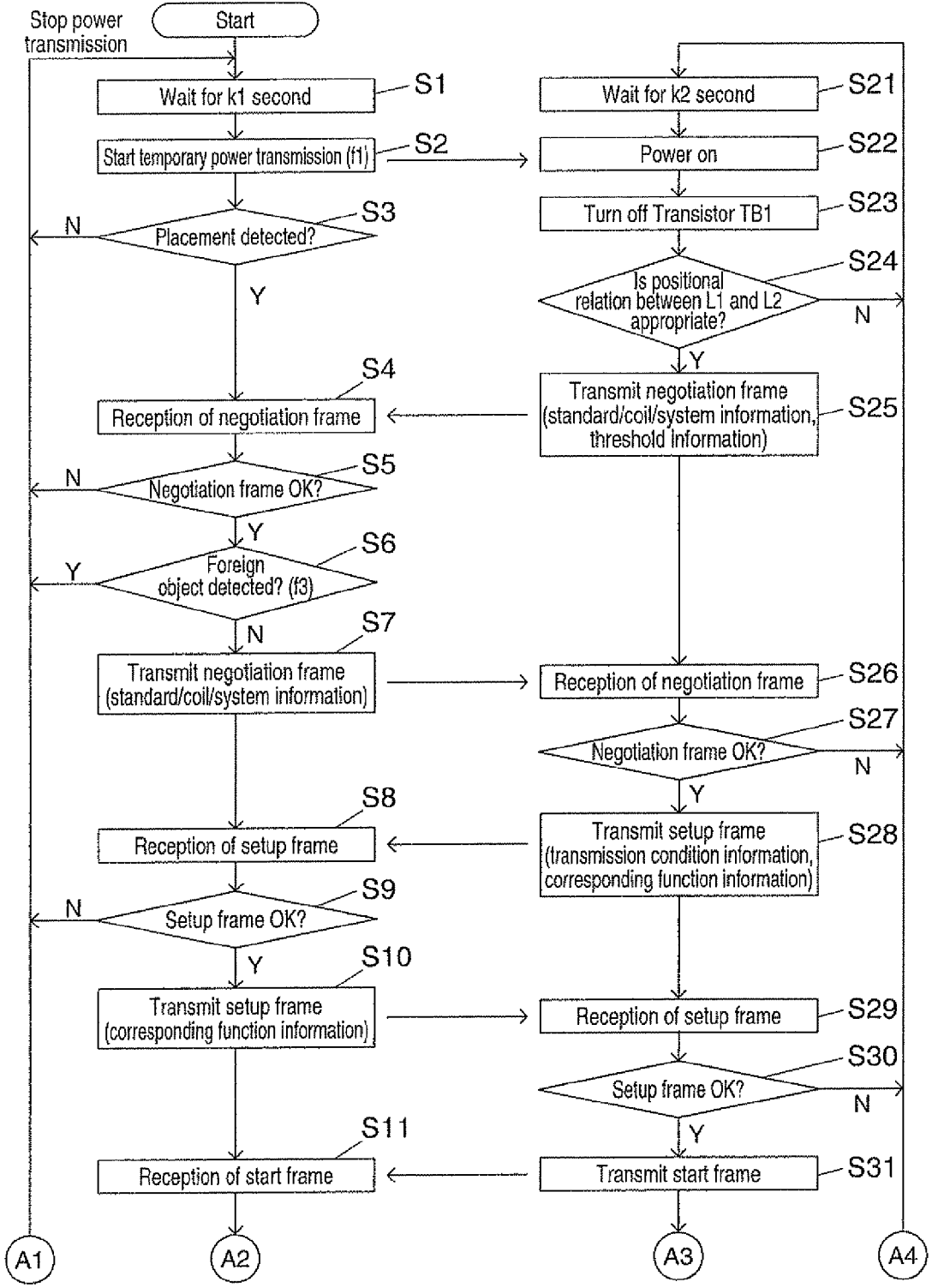
FIG. 15 is a flowchart explaining the operation according to the embodiment.
Figure 16:
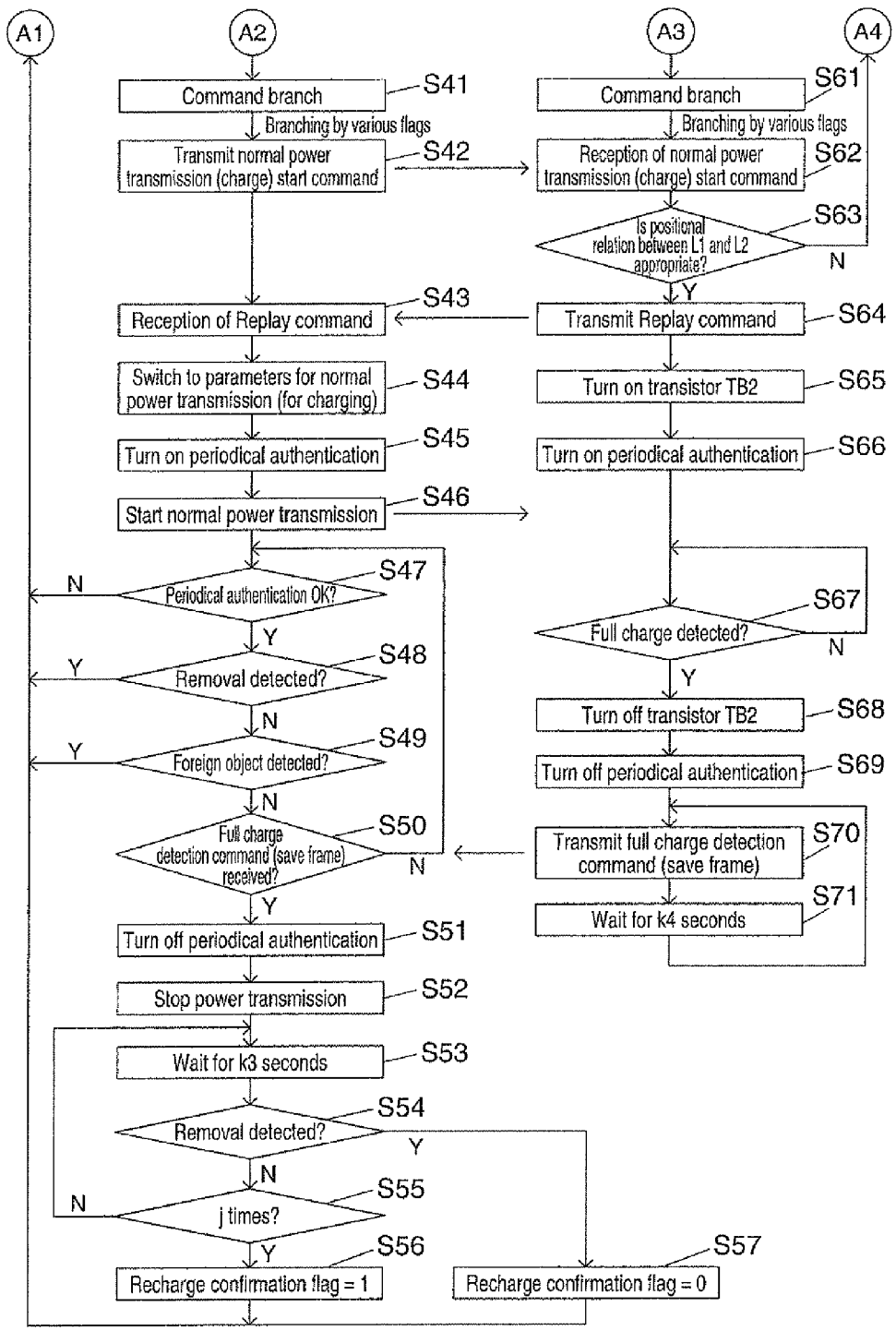
FIG. 16 is a flowchart explaining the operation according to the embodiment.

Next, operations on the power transmission side and the power receiving side will be described in detail with reference to flowcharts shown in FIGS. 15 and 16.

When the power supply is turned on, the power transmission side performs temporary power transmission before the start of normal power transmission (step S2), for example, after a wait of a k1 second (step S1). The temporary power transmission is temporary electric power transmission for placement detection, position detection, and the like, using the primary side and secondary side first coils L11 and L21. That is, the power is transmitted for detecting whether or not the electric apparatus is placed on the charger as shown in F2 of FIG. 11, and, if the electric apparatus is placed, whether or not the electric apparatus is placed on an appropriate position. The driving frequency (a frequency of a driving clock from the driving clock generating circuit) in the temporary power transmission is set to f1, for example.

The temporary power transmission from the power transmission side allows the power receiving side to be turned on (step S22), whereby a reset of the power receiving control device 50 is released. Then, the power receiving control device 50 sets the signal P1Q shown in FIG. 13 to H level. As a result, the transistor TB2 of the power feeding control section 48 is turned off (step S23), so that the electrical connection with the load 90 is interrupted.

Next, the power receiving side determines by using the position detection circuit 56 whether or not a positional relation (a position level) between the primary side first coil L11 and the secondary side first coil L21 is appropriate (step S24). If the positional relation is not appropriate, the power receiving side waits, for example, for a period of k2 seconds (step S21).

On the other hand, if the positional relation is appropriate, the power receiving side makes a negotiation frame and transmits the same to the power transmission side (step S25) through data communication using the primary side and secondary side second coils L12 and L22. The negotiation frame includes a matching code such as standard information and coil information, system information (load state detection method), and hardware information such as threshold information (threshold for detecting a load state) stored in the storing section 53 on the power receiving side.

Upon receiving the negotiation frame (step S4), the power transmission side verifies the negotiation frame (step S5). Specifically, the power transmission side confirms whether or not the standard/coil/system information stored in the storing section 23 on the power transmission side and the standard/coil/system information received from the power receiving side are matched. Then, if the negotiation frame is determined to be appropriate, foreign object detection is performed (step S6).

Specifically, the power transmission side sets the driving frequency to a frequency f3 for detecting a foreign object. Then, based on the threshold information (safety threshold information) received from the power receiving side, the first foreign object detection before the start of normal power transmission is performed so as to determine whether or not a load state of the power receiving side is appropriate. For example, a foreign object detection enable signal is activated so as to instruct the load state detection circuit 30 to start detecting a foreign object. The foreign object detection can be realized by comparing, for example, load state detection information (pulse width information) from the load state detection circuit 30 with a threshold (META) for detecting a load state received from the power receiving side. After the period of detecting a foreign object ends, the power transmission side changes the driving frequency to the frequency f1 for normal power transmission.

If the negotiation frame is determined to be inappropriate in the step S5 or a foreign object is detected in the step S6, the power transmission side stops power transmission so as to return to the step S1.

Next, the power transmission side makes a negotiation frame, and transmits the same to the power receiving side by data communication using the primary side and secondary side second coils L12 and L22 (step S7). The negotiation frame includes, for example, the standard information, the coil information, and the system information stored in the storing section 23 on the power transmission side.

Upon receiving the negotiation frame (step S26), the power receiving side verifies the negotiation frame (step S27). Specifically, the power receiving side confirms whether or not the standard/coil/system information stored in the storing section 53 on the power receiving side and the standard/coil/system information received from the power transmission side are matched. Then, if the negotiation frame is determined to be appropriate, the power receiving side generates a setup frame and transmits the same to the power transmission side by data communication using the primary side and secondary side second coils L12 and L22 (step S28). The setup frame includes parameter data such as transmission condition information, corresponding function information, and the like. The communication condition information includes the driving voltage and the driving frequency of the primary coil, and the like. The corresponding function information represents an additional function for each application. If the setup frame is not appropriate, the sequence returns to the step S21.

Upon receiving the setup frame (step S8), the power transmission side verifies the setup frame (step S9). If the setup frame from the power receiving side is appropriate, the power transmission side makes a setup frame on the power transmission side and transmits the same to the power receiving side by data communication using the primary side and secondary side second coils L12 and L22 (step S10). On the other hand, if the setup frame is not appropriate, the power transmission side stops power transmission so as to return to the step S1.

Upon receiving the setup frame (step S29), the power receiving side verifies the setup frame (step S30). If the setup frame is appropriate, the power receiving side makes a start frame and transmits the same to the power transmission side by data communication using the primary side and secondary side second coils L12 and L22 (step S31). On the other hand, if the setup frame is not appropriate, the power receiving side returns to the step S21.

If the start frame is transmitted, the power transmission side and the power receiving side move to a command branch (steps S41 and S61). That is, a command determination is performed so as to be split into one of command processings corresponding to each flag.

Specifically, if there is no command requiring a priority processing (e.g., an interruption command), the power transmission side transmits the normal power transmission (a charge) start command to the power receiving side by data communication using the primary side and secondary side second coils L12 and L22 (step S42). When receiving the normal power transmission start command (step S62), the power receiving side determines whether or not the positional relation between the primary side first coil L11 and the secondary side first coil L21 is appropriate (step S63). If it is appropriate, a response command is transmitted to the power transmission side by data communication using the primary side and secondary side second coils L12 and L22 (step S64).

Upon receiving the response command (step S43), the power transmission side switches the various parameters to those for normal power transmission (step S44). Specifically, parameters such as transmission condition are switched to the parameters set in the setup processing. Then, periodic authentication is turned on (step S45), and normal power transmission starts (step S46).

After transmitting the response command (step S64), the power receiving side turns on the transistor TB2 of the power feeding control section 48 (step S65) so as to start power supply to the load 90. The periodic authentication is turned on so as to perform a periodic load modulation (step S66). Specifically, the transistor TB3 of the load modulation section 46 is turned on and off in accordance with a predetermined pattern in a periodic authentication period.

After the start of normal power transmission, in the periodic authentication period performed by the periodic load modulation, the power transmission side detects a takeover state that may be caused by a metal foreign object or the like having a large area (step S47). The takeover state refers to a state in which, for example, a metal foreign object is placed instead of a portable telephone 510. In accordance with the present embodiment, data communication using the primary side and secondary side second coils L12 and L22 is performed during the periodic authentication period. If a metal foreign object is placed instead of the portable telephone 510, data communication cannot be normally performed during the periodic authentication period, whereby a takeover can be detected on the primary side. Also, in this periodic authentication period, removal detection and foreign object detection are performed (steps S48 and S49) by the load state detection circuit 30. If any takeover is detected in the periodic authentication, or a removal or a foreign object is detected, the power transmission is stopped and the process sequence returns to the step S1.

After the start of normal power transmission, the power receiving side detects whether or not the battery 94 is fully charged (step S67). If the full charge is detected, the transistor TB2 is turned off (step S68), and the power supply to the load 90 is stopped. Subsequently, the periodic authentication is turned off (step S69). Then, a full charge detection command (a save frame) that notifies the detection of a full charge is transmitted to the power transmission side by data communication using the primary side and secondary side second coils L12 and L22 (step S70), and after a wait period of k4 seconds (step S71), the processing of the step 70 is repeated.

Upon receiving the full charge detection command (the save frame), the power transmission side turns off the periodic authentication, and stops the power transmission (steps S51 and S52). Then, the power transmission side moves to the standby phase after the full charge detection (step S53).

In the standby phase after the full charge detection, for example, removal detection is performed once every k3 seconds (step S54). Then, if a removal is detected, the recharge confirmation flag is reset to 0 (step S57), and the power transmission is stopped, and the process returns to the step S1.

In the standby phase after the full charge detection, for example, a recharge is confirmed once every k3×j seconds, and the recharge confirmation flag is set to 1 (step S55 and S56). Then, the power transmission is stopped and the sequence returns to the step S1. In this case, the negotiation processing and the setup processing are performed; and since the recharge confirmation flag is 1 in the command branch of the step S41, the power transmission side moves to the processing of the recharge confirmation command.

It is noted that, although some embodiments of the invention have been described in detail above, those skilled in the art would readily appreciate that many modifications are possible without departing in substance from the novel matter and effects of the invention. Accordingly, such modifications are deemed to be included within the scope of the invention.

Figure 17:
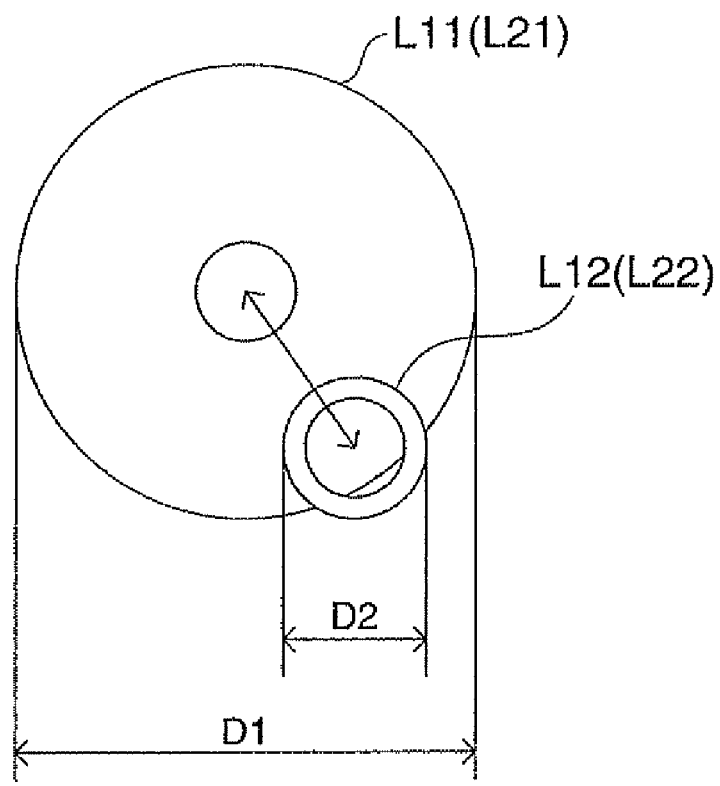
FIG. 17 is a flowchart explaining a modification example of a plane arrangement in the positional relation of the first and second coils.

For example, throughout the specification and the drawings, any terms described at least once with other different terms that encompass broader meaning or are synonymous can be replaced with these different terms in any sections of the specification and the drawings. Further, combinations of the embodiment and the modifications can be included in the scope of the invention. Also, the configurations and the operations of the power transmission control device, the power transmission device, the power receiving control device, and the power receiving device, and further the method of negotiation, setup, and command processings, the method of collating coil information, the method of detecting load states and the like are not limited to those described in the embodiments, and various modifications can be made thereto. For example, FIG. 2 illustrates the example of the whole second coil L12 that is arranged to be stacked on the transmission surface side of the first coil L11. This configuration is not limited thereto. FIG. 17 illustrates the example of a part of the second coil L12 that is arranged to be stacked on the transmission surface side of the first coil L11. Under such configuration as in FIG. 17, it is possible to keep the area occupancy of the first coil L11 and the second coil L12 from increasing while retaining each function of the both coils. Particularly, a greater effect in reducing the area occupancy can be realized when arranging the center of the second coil L12 to be stacked on the first coil L11 as shown in FIG. 17. The positional configuration of the second coil L12 as in FIG. 17 can be applied to the second coil L12 as in FIG. 7 or FIG. 8.

What is claimed is:

1. A coil unit comprising:
a first coil having an outer diameter of D1; and
at least one second coil having an outer diameter of D2 (D2<D1),
the at least one second coil being arranged on a transmission surface side of the first coil, and a part or whole of the at least one second coil being overlapped with the first coil when viewed from the transmission surface side;
a center of the at least one second coil not being coincident with a center of the first coil, as viewed from the transmission surface side; and
each of the first coil and the at least one second coil being an air-core coil having an air-core section at the center thereof, and the first coil and the at least one second coil being arranged such that an outer periphery of the at least one second coil does not overlap the air-core section of the first coil.

2. A coil unit according to claim 1, the at least one second coil including a plurality of the second coils that are arranged at equal intervals in a circumferential direction of the first coil.

3. A power transmission device that transmits power to a power reception device, the power transmission device comprising:
the coil unit recited in claim 1; and
a power transmission control device that controls driving of the first coil and the at least one second coil of the coil unit,
the power transmission control device controlling power transmission to the power reception device through the first coil, and the power transmission control device controlling data communication with the power reception device through the second coil.

4. A power reception device that receives power transmitted from a power transmission device, the power reception device comprising:
the coil unit recited in claim 1; and
a power reception control device,
the power reception control device controlling power reception of power from the power transmission device through the first coil, and the power reception control device controlling data communication with the power transmission device through the second coil.

5. A coil unit comprising:
a first coil having an outer diameter of D1; and
at least one second coil having an outer diameter of D2 (D2<D1),
the at least one second coil being arranged on a transmission surface side of the first coil, and a part or whole of the at least one second coil being overlapped with the first coil when viewed from the transmission surface side, and
the at least one second coil including a plurality of the second coils that are arranged at equal intervals in a circumferential direction of the first coil.

6. A power transmission device that transmits power to a power reception device, the power transmission device comprising:
a coil unit that comprises:
a first coil having an outer diameter of D1; and
at least one second coil having an outer diameter of D2 (D2<D1),
the at least one second coil being arranged on a transmission surface side of the first coil, and a part or whole of the at least one second coil being overlapped with the first coil when viewed from the transmission surface side, and
a power transmission control device that controls driving of the first coil and the at least one second coil of the coil unit,
the power transmission control device controlling power transmission to the power reception device through the first coil, and the power transmission control device controlling data communication with the power reception device through the second coil.

* * * * *